United States Patent
Torkildsen

(10) Patent No.: US 6,339,963 B1
(45) Date of Patent: Jan. 22, 2002

(54) FLUID FLOW MEASUREMENT DEVICE

(75) Inventor: Bernt Helge Torkildsen, Bergen-Sandviken (NO)

(73) Assignee: Framo Engineering AS, Sandsli (NO)

(*) Notice: Subject to any disclaimer, the term of this patent is extended or adjusted under 35 U.S.C. 154(b) by 0 days.

(21) Appl. No.: 09/254,400

(22) PCT Filed: Aug. 15, 1997

(86) PCT No.: PCT/GB97/02218

§ 371 Date: Apr. 23, 1999

§ 102(e) Date: Apr. 23, 1999

(87) PCT Pub. No.: WO98/10250

PCT Pub. Date: Mar. 12, 1998

(30) Foreign Application Priority Data

Sep. 6, 1996 (GB) .......................... 96 18 684

(51) Int. Cl.⁷ .............................. G01F 1/44; G01F 7/00
(52) U.S. Cl. ...................................... 73/861.63; 73/197
(58) Field of Search ........................ 73/861.63, 861.64, 73/861.52, 861.61, 861.04, 861.06, 202, 197, 198

(56) References Cited

U.S. PATENT DOCUMENTS

| | | | |
|---|---|---|---|
| 3,445,335 A | * 5/1969 | Gluntz | .................. 73/861.63 |
| 4,112,757 A | 9/1978 | Hayward | |
| 5,591,922 A | * 1/1997 | Segeral et al. | ........... 73/861.04 |
| 5,608,170 A | * 3/1997 | Atkinson et al. | ........ 73/861.04 |
| 5,693,891 A | * 12/1997 | Brown et al. | ............ 73/861.04 |
| 6,053,055 A | * 4/2000 | Nelson | ..................... 73/861.52 |

FOREIGN PATENT DOCUMENTS

| | | |
|---|---|---|
| DE | 705455 | 4/1941 |
| DE | 848 422 | 9/1952 |
| EP | 0 392 272 | 10/1990 |
| EP | 0 552 916 | 7/1993 |

OTHER PUBLICATIONS

N. Brook, "Flow Measurement of Solid–Liquid Mixtures Using Venturi and Other Meters", Proc. Instr. Mech. Engrs,. vol. 176, No. 6, 1962, XP002046992, pp. 127–140.

* cited by examiner

Primary Examiner—Harshad Patel
(74) Attorney, Agent, or Firm—Young & Thompson

(57) ABSTRACT

A device for measuring fluid flow rates has a body defining a conduit for the fluid, the body having selectable first and second configurations, in the first configuration the body presents a first constriction in the conduit for measuring a first range of fluid flow rates, and in a second configuration the body presents a second construction in the conduit for measuring a second range of fluid flow rates, the second constriction being narrower than the first constriction, the body being arranged for operative connection to parts for determining the pressure difference between each constriction.

25 Claims, 2 Drawing Sheets

FLUID FLOW MEASUREMENT DEVICE

Figure 1:
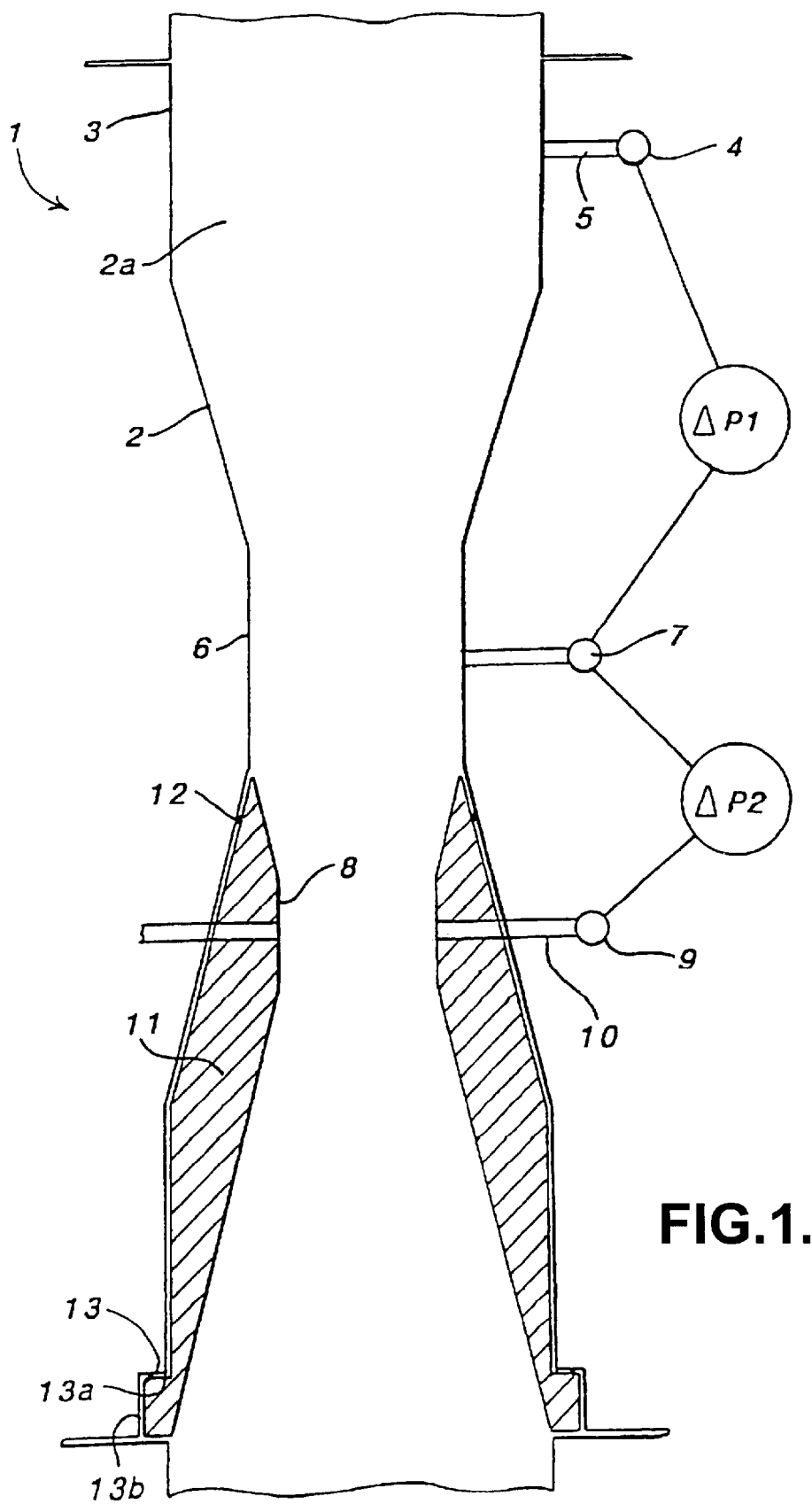

The present invention relates to a fluid flow measurement device, particularly to a momentum flux device for use in the metering of fluid flow in venturi tubes.

Fluid flow measurement devices based on the principle of momentum flux measurement are known in the art as pressure drop measurement devices. Examples of these are orifice plate, nozzle and venturi tubes described in ISO 5167. A venturi tube works on the principle that the flow of fluid through a body exerts a pressure on the body, the pressure being dependent on the rate of fluid flow. The venturi tube comprises a pipe formed with a constriction or "throat". The flow velocity of fluid in the body increases as it flows through the throat. The portion of the pipe downstream of the throat is tapered so that the pipe cross section returns gradually to its value upstream of the throat. The pressure exerted by the fluid (measurable by a pressure measurement means such as a U-tube manometer) in the region of the throat is correspondingly less than that in the region upstream (or downstream) of the throat. The difference in pressure between the two regions of the venturi tube depends on the flow velocity and thus depends on the quantity of fluid passing through the pipe per unit time. Hence this pressure difference provides a measure of the fluid flow rate.

One problem with conventional fluid flow measurement devices based on the principle of momentum flux measurement, or pressure drop measurement, is that they have a somewhat limited operating range. Thus, it can be difficult or impossible to measure accurately some ranges of fluid flow rates. One reason for the limited range of conventional devices is that a predictable and stable correlation between measured pressure drop across the device and the momentum flux of a fluid flowing within the device requires the fluid to have certain flow parameters within a certain range. In particular, the Reynolds number, which expresses the ratio between momentum and the viscous forces in the fluid flow, must be within a certain range. For a given fluid or mixture of fluids this requires the fluid velocity to be within a certain range. Another limitation on conventional pressure drop measurement devices is that they rely on the quantification of a pressure differential caused by fluid flowing at different velocities in different parts of the device. For certain flow rates, the pressure differential created by a conventional device may be too low, or too high, to be detectable or accurately measurable by the differential pressure sensor. Operating range may also be limited by the maximum pressure loss acceptable for the process in which the device is installed, as the device pressure loss is associated with the pressure drop across it.

Therefore, measurement using conventional devices of fluid flow rates which are subject to fluctuation outside the operating range of the device installed requires the replacement of the measurement device by another suitably sized device capable of measuring the range of fluid flow rates in question. For multi-phase flow of unprocessed well streams in particular, the range of flow conditions and the operating range required are normally very large and often require more than one conventional measurement device in order to cover the whole range of fluid flow characteristics.

The removal and replacement of a metering device requires the fluid flow to be stopped or rerouted during the operation. This may for a variety of reasons be impractical and costly, particularly if the device is located in a remote off-shore or sub-sea area. Furthermore, if the device forms part of an integrated metering system, such as a multiphase flow metering system, removal and replacement of the device can affect the calibration of the system.

The present invention provides a device for measuring fluid flow rates having a body defining a conduit for the fluid, the body having selectable first and second configurations, wherein in the first configuration the body presents a first constriction in the conduit for measuring a first range of fluid flow rates, and in a second configuration the body presents a second constriction in the conduit for measuring a second range of fluid flow rates, the second constriction being narrower than the first constriction, wherein the body is arranged for operative connection to means for determining the pressure difference between each constriction.

The device of the invention operates, in its first configuration, in the same way as a conventional venturi tube. When the flow rate of the fluid decreases below the range at which the pressure difference between the conduit and the first constriction can be measured accurately, the device of the invention may be switched to its second configuration. This switching may be done manually or by remote control. In its second configuration, a second pressure difference is created between fluid flowing in the first constriction and fluid flowing in the second constriction. This second pressure difference provides a means for measuring fluid flow rates outside the operating range of the device in its first configuration.

It is envisaged that for most practical purposes the provision of two pressure differences as described in the second configuration of the device of the invention will be sufficient to measure fluid flow rates over a sufficiently wide range of flow velocities and fluid density characteristics. However, it is also possible to provide more than two, for example three, four or five pressure differentials in third, fourth and fifth configurations of the device.

It is preferred that the or each constriction has a portion of constant transverse cross sectional area to facilitate pressure measurement in the region of the respective constriction. The pressure measurement means may comprise independent manometers for measuring the fluid pressure in the region of the first and second constrictions and in the main conduit. It is also preferred that the conduit has a tapered portion between the first and second constrictions in the second configuration of the device.

In one preferred embodiment of the invention, the device includes an annular member arranged to be moveable within the body to form the second constriction. The annular member may be moveable longitudinally of the conduit. In this case, the annular member preferably has an outer surface shaped to be received within the conduit of the device in snug fit arrangement with the body. Still more preferably the annular member and the body have cooperating portions for providing a snap-fit arrangement in the second configuration of the device.

Alternatively, the annular member may be moveable radially of the conduit. In this case, the annular member may comprise two or more sections which are separable, the sections being separated in the first configuration of the device and being united in the second configuration of the device. Preferably, the annular member has three sections. The annular member may, in the first configuration of the device, be located in a housing surrounding the conduit.

In a preferred embodiment, a body of the device comprises an openable portion which is moveable between a closed position in the first configuration of the device and an open position for allowing insertion of the annular member to form the second configuration of the device. One or both of the annular member and the openable portion may be moveable by hydraulic means and/or electronic means. It is preferred that first biasing means be provided for biasing the annular member radially inwardly towards a position at which the second configuration of the device is formed. Second biasing means may be provided for biasing the openable portion towards its closed position. The or each biasing means may be a compression spring.

Conveniently, in the first configuration of the device, the annular member bears upon the openable portion in its closed position under the influence of the first biasing means. First urging means may be provided for urging the annular member radially outwardly so that it no longer bears upon the openable portion. Second urging means may be provided for urging the openable portion towards its open position. The or each urging means may be hydraulically operable.

In one preferred embodiment, the openable portion is a telescopic portion of the body of the device.

It is also preferred that the annular member includes a pressure tapping for communication between fluid flowing in the conduit of the device in its second configuration and the third pressure measurement means.

Also preferred is that the annular member be provided with one or more sealing members for sealing the annular member in fluid-tight engagement with the body in the second configuration of the device.

Accordingly, the invention relates to a remote control or manually insertable mechanical constriction for a venturi tube in order to create an additional pressure differential in the tube. This is achieved because the momentum flux in the fluid flow is increased in the second constriction of the conduit in relation to the first constriction. A higher differential pressure is thereby provided allowing accurate and stable measurements at low flow rates or at certain density conditions to be achieved. The device of the invention increases the operating range of the conventional venturi tube with a minimum of human interference.

Figure 2:
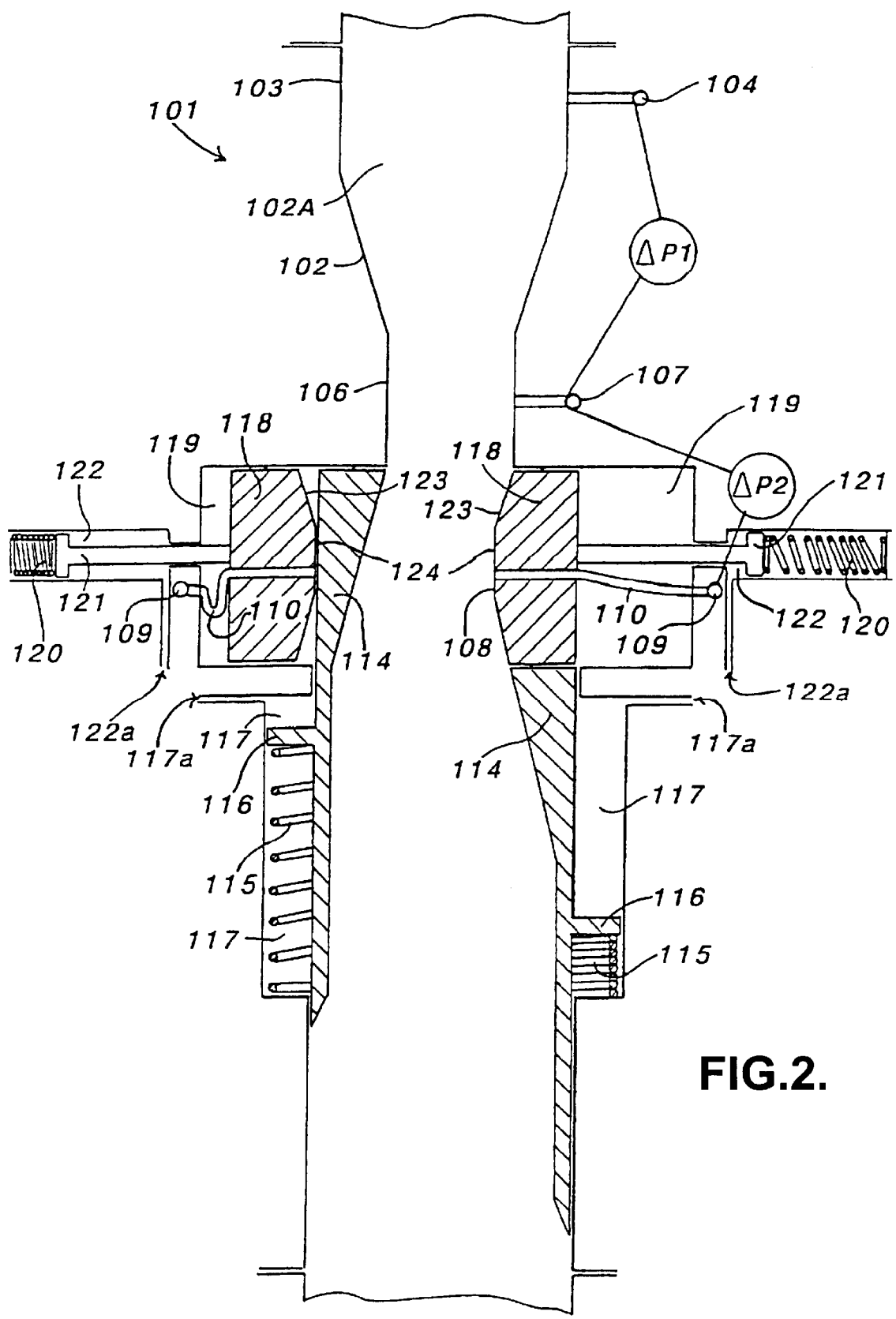

In order that the invention may be clearly understood and readily carried into effect, two specific embodiments thereof will now be described with reference to the accompanying drawings, in which:

FIG. 1 shows a cross section on the elongate body of a device according to a first embodiment of the invention; and FIG. 2 shows a cross section on the elongate body of a device according to a second embodiment of the invention.

Referring to FIG. 1, there is shown a device 1 comprising an elongate body 2. Body 2 has a conduit 2a therethrough having a first region 3 of constant cross section. Pressure measurement means 4 is connected to pressure tapping 5 in region 3 of body 2. Pressure measurement means 4 may be any suitable manometer, such as a U-tube manometer.

Downstream of first region 3, body 2 is tapered until a second region 6 of constant cross section is reached. Second region 6 of body 2 is of narrower cross section than the first region 3, forming a first constriction in body 2, and is operatively connected to pressure measurement means for measuring the pressure exerted by the fluid in second region 6. The first pressure differential $\Delta P_1$ between first region 3 and second region 6 of body 2 provides a means for measuring the rate of flow of fluid in body 2 in the same way as a conventional venturi tube.

In the first configuration of device 1, body 2 is flared downstream of second region 6 until the cross section of body 2 returns to the same magnitude as first region 3. Body 2 has no second constriction and functions as a conventional venturi tube. In the second configuration of device 1, body 2 is further tapered downstream of second region 6 until a third region 8 of constant cross section is reached. Third region 8 is of narrower cross section than second region 6, forming a second constriction in body 2, and is operatively connected to pressure measurement means 9 vis pressure tapping 10. Second pressure differential $\Delta P_2$ between second region 6 and third region 8 provides a means for measuring fluid flow rates in body 2 outside the range of flow rates measurable using $\Delta P_1$.

In the embodiment shown in FIG. 1, third region 8 of body 2 is formed as a removable annular member 11 which can be manually inserted into body 2 when required. Seals 12 and 13 are provided to prevent fluid flowing between the annular member 11 and body 2. Snap fit members 13a and 13b ensure that annular member 11 and body 2 are securely united in the second configuration of the device.

Referring now to FIG. 2, there is shown a device 101 comprising body 102. Body 102 has a conduit 102a therethrough having a first region 103 of constant cross section operatively connected to pressure measurement means 104. Downstream of first region 103, body 102 is tapered until a second region 106 of constant cross section is reached. Second region 106 of body 102 is of narrower cross section than first region 103, forming a first constriction in body 102, and is operatively connected to pressure measurement means 107.

FIG. 2 shows device 101 in both its first and its second configurations. On the left of the centre line of elongate body 102, device 101 is shown in its first configuration and, on the right hand side of the centre line of elongate body 102, device 101 is shown in its second configuration.

Body 102 of device 101 comprises an openable portion 114. In the embodiment shown in FIG. 2, openable portion 114 is a telescopic portion which forms part of the body 102. Telescopic openable portion 114 is biased towards it closed position by the action of compression spring 115 acting on a fin 116. Compression spring 115 is contained within a piston chamber 117, with fin 116 acting as the piston plunger. A hydraulic fluid can be supplied when necessary to piston chamber 117 via access conduit 117a.

Annular member 118 is, in the first configuration of device 1, mounted behind telescopic openable portion 114 inside a housing 119. Annular member 118 comprises three sections which together surround body 102. Annular member 118 is biased towards body 102 by the action of compression spring 120 on piston portion 121 connected to annular member 118. Compression spring 120 is located in piston chamber 122. A hydraulic fluid can be supplied when necessary to piston chamber 122 via access conduit 122a.

In the second configuration of device 101, body 102 is tapered downstream of second region 106, the tapering being achieved by a suitably shaped surface 123 on annular member 118, until a third region 108 of constant cross section is reached. Third region 108 is of narrower cross section than second region 106, forming a second constriction in body 102, and is formed by a suitably shaped surface 124 on annular member 118. Third region 108 communicates with third pressure measurement means 109 via pressure tapping 110.

When it is desired to change device 101 from its first to its second configuration, hydraulic pressure is applied through conduit 122a to chamber 122, forcing compression spring 120 to compress and release the bias of annular member 118 against body 102. Subsequently, pressure is applied in conduit 117a to chamber 117 to urge compression spring 115 to compress, thereby causing telescopic openable portion 111 to open. Pressure in line 122a is then discontinued, allowing annular member 118 to slide into position as the third region of body 102 under the influence of compression spring 120.

Device 101 then adopts the configuration shown to the right of FIG. 2.

When it is desired to convert device 101 from its second configuration to its first configuration, hydraulic pressure is first supplied in line 117a to compress further compression spring 115 and release telescopic openable portion 114 from engagement with annular member 118. Subsequently, hydraulic pressure is supplied in line 122a to compress compression spring 120 and cause annular member 118 to slide back into housing 119. Pressure in line 117a is then discontinued and telescopic openable portion 114 returns to its original closed position under the influence of compression spring 115.

What is claimed is:

1. A device for measuring fluid flow rates the device comprising:
   a conduit for the fluid,
   the conduit comprising
      a first portion having a first pressure tap and a uniform first internal transverse cross sectional area of a first value,
      a second portion having a second pressure tap and a second internal transverse cross sectional area of a second value,
      a third portion having a third pressure tap and a third internal transverse cross sectional area of a third value and
   means for altering the third portion to convert the third cross sectional area between a first value and a third value,
   wherein the second value is smaller than the first value and the third value is smaller than the second value.

2. A device according to claim 1, wherein the second and third sections each have constant transverse cross sectional area.

3. A device according to claim 1, wherein the conduit has a tapered portion between the first and second portions.

4. A device according to claim 1, wherein said altering means includes an annular member and means to move said annular member within the third portion.

5. A device according to claim 4, wherein the annular member is movable longitudinally of the conduit.

6. A device according to claim 5, wherein the annular member has an outer surface shaped to be received within the conduit of the device in snug fit arrangement.

7. A device according to claim 5, wherein the annular member and the conduit have cooperating portions for providing a snap-fit arrangement.

8. A device according to claim 4, wherein the annular member is moveable radially of the conduit.

9. A device according to claim 8, wherein the annular member comprises two or more sections which are separable, the sections being separated in a first configuration of the device and being united in a second configuration of the device.

10. A device according to claim 9, wherein the annular member has three sections.

11. A device according to claim 9, wherein first biasing means are provided for biasing the annular member radially inwardly towards a position at which the second configuration of the device is formed.

12. A device according to claim 11, wherein the biasing means is a compression spring.

13. A device according to claim 9, comprising an openable portion and means for moving the openable portion between a closed position in the first configuration of the device and an open position for allowing insertion of the annular member to form the second configuration of the device.

14. A device according to claim 13, wherein the annular member and the openable portion are moveable by hydraulic means.

15. A device according to claim 13, wherein second biasing means are provided for biasing the openable portion towards its closed position.

16. A device according to claim 15, wherein in the first configuration of the device, the annular member bears upon the openable portion.

17. A device according to claim 16, wherein first urging means are provided for urging the annular member radially outwardly so that it no longer bears upon the openable portion.

18. A device according to claim 17, wherein second urging means are provided for urging the openable portion towards its open position.

19. A device according to claim 17, wherein the urging means is hydraulically operable.

20. A device according to claim 13, wherein the openable portion is a telescopic portion of the device.

21. A device according to claim 13, wherein the annular member and the openable portion are moveable by electronic means.

22. A device according to claim 8, wherein the annular member is located in a housing surrounding the conduit.

23. A device according to claim 4 wherein the annular member has a pressure tapping for communication between fluid flowing in the conduit of the device in its second configuration and the pressure measurement means.

24. A device according to claim 4, wherein the annular member is provided with one or more sealing members for sealing the annular member in fluid-tight engagement.

25. A device according to claim 1, wherein the first portion is adjacent the second portion.

* * * * *